Figure 1:
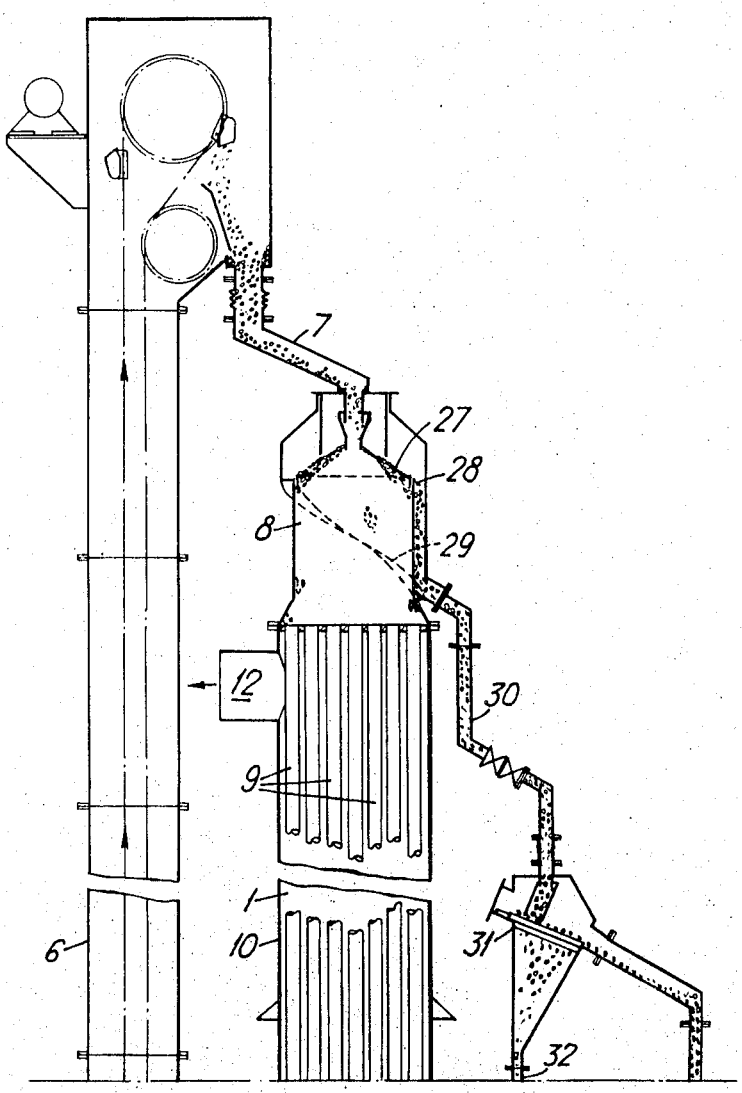

United States Patent [19]

Evans et al.

[11] 3,844,251
[45] Oct. 29, 1974

[54] VAPOR DEPOSITION APPARATUS

[75] Inventors: David Evans; Alexander Bowen Simpson, both of Swansea, Wales

[73] Assignee: The International Nickel Company, Inc., New York, N.Y.

[22] Filed: Sept. 6, 1973

[21] Appl. No.: 394,820

Related U.S. Application Data

[62] Division of Ser. No. 155,869, June 23, 1971, Pat. No. 3,779,795.

[30] Foreign Application Priority Data

July 7, 1970 Great Britain .................. 32964/70

[52] U.S. Cl. ................................ 118/48, 23/284
[51] Int. Cl. ............................................ C23c 13/08
[58] Field of Search ........................ 118/48–49.5, 118/DIG. 5, 303; 117/DIG. 6, 100 R, 100 A, 100 B, 100 C, 100 D, 100 M, 100 S, 107.2; 23/288 G, 284

[56] References Cited
UNITED STATES PATENTS

| | | | |
|---|---|---|---|
| 477,909 | 6/1892 | Meier et al. | 118/303 UX |
| 2,071,846 | 2/1937 | Lamb et al. | 118/303 |
| 2,319,865 | 5/1943 | James | 118/303 |
| 2,586,818 | 2/1952 | Harms | 117/DIG. 6 |
| 2,990,807 | 7/1961 | Gerow | 118/48 |
| 3,605,685 | 9/1971 | West et al. | 118/48 |
| 3,617,347 | 11/1971 | Kuratomi | 118/48 X |

FOREIGN PATENTS OR APPLICATIONS

| | | | |
|---|---|---|---|
| 444,833 | 3/1936 | Great Britain | 118/303 |
| 476,828 | 12/1937 | Great Britain | 118/303 |
| 620,287 | 3/1949 | Great Britain | 118/48 |

OTHER PUBLICATIONS

The Industrial Chemist, "Twenty Five Years' Progress in Nickel Refining" 12/1959, pp. 583–588.

Primary Examiner—Morris Kaplan
Attorney, Agent, or Firm—Ewan C. MacQueen; George N. Ziegler

[57] ABSTRACT

Variously sized metal pellets that are produced by decomposition of metal-containing gas, in process wherein pellets are continuously recirculated through a preheater and a reaction chamber, are preheated uniformly and then radially mixed after issuing from the preheater and before entrance to the reaction chamber.

6 Claims, 2 Drawing Figures

VAPOR DEPOSITION APPARATUS

The present application is a division of our copending U.S. application Ser. No. 155,869, filed June 23, 1971, now U.S. Pat. No. 3,779,795.

The present invention relates to production of metal pellets and more particularly to production of pellets by decomposition of a metal-containing gas.

In the Mond process for producing nickel through the formation and subsequent decomposition of nickel cabonyl, as described in United Kingdom Pat. No. 620,287, the carbonyl is brought into contact in a decomposer with nickel pellets that have been preheated to a temperature above the decomposition temperature of the carbonyl. The nickel is deposited on the pellets as the pellets pass downwards through the reaction chamber of the decomposer in counter-current to a stream of carbonyl-containing gas, and the pellets leaving the bottom of the reaction chamber are circulated through the preheater and thence back to the reaction chamber.

Preferably the preheater is mounted above the reaction chamber and consists of a calandria of vertical tubes surrounded by a heating jacket through which hot flue gases are passed to heat the tubes. At the top of the preheater is a reservoir vessel into which the nickel pellets are charged. From the bottom of the reservoir the pellets pass down through the tubes of the preheater and out of the bottom into a collecting chamber between the preheater and the top of the reaction chamber.

Deposition of nickel on the pellets while passing through the reaction chamber causes the pellets to increase in size, and at any particular time the circulating charge includes pellets of all sizes ranging from minute seed particles to fully-grown pellets of the desired product size, say ⅜ inch diameter.

For stable continuous operation it is important that the size distribution of the pellets should remain substantially constant with time and for this purpose the rate of introduction of effective seed particles (expressed as the number of seeds per unit time) must be maintained substantially the same as the rate of removal of fully-grown pellets, and it is also important that the pellets of all sizes should grow uniformly. In practice, however, it is found that unless special precautions are adopted the larger pellets tend to grow in preference to the smaller ones, so that even if the size distribution of the initial pellet charge is uniform, a deficiency of intermediate-size pellets soon develops. This leads to disturbances in the reaction chamber and to 'bumping' of the pellet bed, which may become severe enough to endanger the apparatus.

An object of the present invention is to provide an improvement in apparatus for producing metal pellets.

Figure 2:
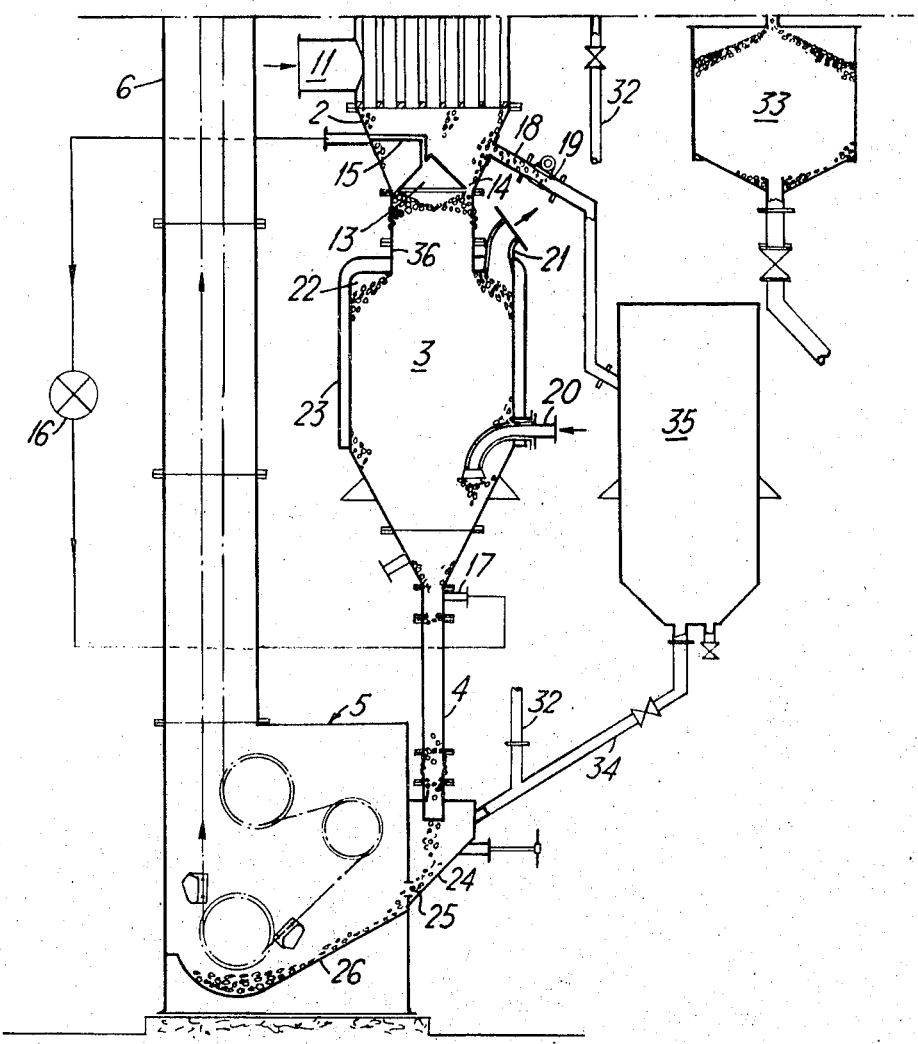

Other objects and advantages will become apparent from the following description taken in conjunction with the accompanying drawing wherein FIGS. 1 and 2 illustrate a diagrammatic vertical-section view (FIG. 2 being viewed as a downward extension of FIG. 1) of a carbonyl decomposer that is specially adapted for production of metal pellets in accordance with an advantageous embodiment of the invention.

Generally speaking, the aforementioned disadvantageous effects are partly or wholly countered by a process comprising preheating the pellets uniformly and by radially mixing the pellets issuing from the preheater before the pellets enter the reaction vessel, so that the pellets passing down and issuing from the outer and central tubes of the preheater are mixed with those issuing from the intermediate tubes. The invention also provides carbonyl decomposer apparatus adapted for carrying out the process. It is to be especially noted that the invention is particularly advantageous for producing nickel pellets from nickel carbonyl.

To ensure uniform heating of the pellets it is important to control their passage down the tubes of the preheater so that the rate of flow down each tube is substantially the same, within a factor of say 2:1. If the flow down any of the tubes is too slow, there is a tendency for the pellets in it to overheat, leading to sticking and blockage of the tube.

Radial mixing can be effected by passing the pellets through an annular opening between the collecting chamber and the reaction chamber, and advantageously the collecting chamber is shaped as a frustum of an inverted cone and a conical baffle is mounted, apex upwards, inside the collecting chamber so that the pellets are discharged from the collecting chamber to the reaction chamber through an annular gap between the base of the baffle and the bottom of the collecting chamber wall. This construction has the advantage that the conical baffle tends to retard the flow of pellets down the tubes nearest the center of the preheater, down which the pellets would otherwise flow most quickly, and by suitable correlation of the geometry of the two cones the flow rates through all the tubes from the center to the periphery of the preheater may be made substantially uniform. A satisfactory value for the apex angle of the conical baffle is found to be about 90° and for the angle of the wall of the collecting chamber about 23° from the vertical, but the optimum values may be determined by experiment for any given apparatus.

To ensure effective mixing the mean radius of the annular gap should be about half the radius of the bottom of the preheater. The gap should be wide enough to allow the pellets to pass freely through it, but the width of the gap should be small relative to its mean radius, e.g., from ¼ to 1/6 of the radius. A convenient width is from 4 to 7 times the diameter of the largest pellets in the bed.

The radial mixing of the pellets in the collecting chamber counteracts the tendency of the larger pellets to segregate when they are discharged into the pellet reservoir from a central pipe and to pass preferentially through the outer tubes of the preheater: it is believed that the persistence of this segregation pattern into the reaction chamber may have contributed towards the preferential growth of the larger particles.

The use of an annular passage into the reaction chamber to effect radial mixing of the pellets has the further advantage that the associated reduction in the cross-section of the inlet to the reaction chamber hinders diffusion of carbonyl-containing gas from the reaction chamber into the preheater, where it could cause undesirable plating. As a further precaution against such diffusion the inner conical baffle in the preferred apparatus is advantageously hollow and is provided with a tube through which gas can be drawn off from the space within the cone. This gas may be recirculated by means of a compressor to the bottom of the reaction chamber below the carbonyl-containing gas inlet and, beneficially, to the neighborhood of the pellet outlet from the reaction chamber where it serves to prevent carbonyl-containing gas fed into the reaction chamber from passing out of the reaction chamber with the discharged pellets.

According to a further feature of the invention, one or more downwardly-inclined outlets with drain valves, leading to an emergency drain vessel, are provided in the wall of the collecting chamber to enable the preheater to be drained of pellets in an emergency shutdown. Conveniently three or more such outlets are spaced symmetrically around the collecting chamber at the same level.

If for any reason pellet circulation ceases and the pellets are allowed to remain stationary in the preheater tubes, the pellets tend to stick and very quickly weld together and block the tubes. It is important that all the preheater tubes are emptied simultaneously and very quickly, and the provision of the outlets from the collecting chamber facilitates this. Advantageously the drain valves are magnetic valves of the kind in which flow of the ferromagnetic nickel is normally prevented by the application of an external magnetic field, removal of which releases the blockage and allows the pellets to flow out. To ensure that the preheater is emptied without delay if the flow of pellets is impeded, the valves are arranged to be opened automatically in the event either of underload or overload of the elevator drive or of failure of the power supply to the drive. An underload would result if pellets ceased to flow from the tail pipe, and an overload if there was an elevator breakdown.

Referring to the FIGS. 1 and 2 of the drawing, the apparatus comprises a pellet preheater 1, mounted above and connected through a pellet collecting chamber 2 to a reaction vessel 3 having a tail pipe 4 leading to the boot 5 of a totally enclosed bucket elevator 6 arranged to collect nickel pellets that have come from the reaction chamber through the tail pipe, raise them to the top of the apparatus and discharge them through a pipe 7 into a pellet reservoir 8 above the preheater 1.

Nickel pellets from the reservoir 8 at a temperature of approximately 180°C. pass down through the vertical tubes 9 of the preheater and are heated to approximately 220°C. by hot gases circulating through the heating jacket 10 surrounding the tubes from an inlet 11 to an outlet 12. The pellets discharged from the pipe 7 into the reservoir have sizes ranging from very small seed particles up to about ⅜ inch, and the larger pellets tend to segregate to the outside of the mass in the reservoir and pass down the outer tubes of the preheater.

From the bottom of the tubes 9, the pellets enter the frusto-conical collecting chamber 2, the walls of which are inclined to the vertical at about 23°. Mounted inside this chamber is a baffle 13 in the form of a hollow inverted 90° cone which serves to retard the passage of the pellets down the inner tubes of the preheater. The baffle 13 and the inwardly sloping walls of the collecting chamber co-operate to guide the smaller pellets from the inner tubes of the preheater outwards and the larger pellets from the outer tubes inwards so that they are mixed and pass together through the annular opening 14 into the top of the decomposer 3. This opening is about 2 inches wide.

A pipe 15 leads from the interior of the conical baffle 13 via a compressor 16 to a gas inlet 17 at the top of the tail pipe of the decomposer, and three equidistantly spaced outlet pipes 18 lead from the collecting chamber to an emergency pellet drain vessel 35 via magnetic valves 19, which are normally closed. Only one of the pipes 18 and valves 19 is shown in the drawing. Drain pipe 34 leads from emergency drain vessel 35 to hopper 24.

A mixture of carbon monoxide gas and 5 to 20 percent by volume of nickel carbonyl it even moved up to 40 percent of nickel carbonyl is introduced into the lower part of the reaction vessel through waterjacketed inlet pipes 20, of which only one is shown, having flared ends opening downwards into the mass of pellets. This arrangement reduces the pressure differential at the end of the tube and a gas space is formed below the end of the tube as the mass of pellets moves downwards past it.

The gas from the inlets 20 passes upwards through the mass of hot pellets which decompose the nickel carbonyl to form nickel which is deposited on the pellets and causes them to grow. At the same time the pellets are cooled by the endothermic reaction so that the gas progressively comes into contact with hotter pellets as its carbonyl content decreases. Substantially all the gas, still containing about 0.15 percent of undecomposed carbonyl, is removed through outlet tubes 21 communicating with an annular gas space 22 that is formed around the shoulder of the reaction vessel as the pellets move downwards from the bottom of the neck 36 of the vessel.

The outlet tubes 21 are water jacketed to prevent decomposition of the carbonyl and are smooth inside to reduce turbulence of the gas to a minimum until it has been cooled below the decomposition temperature. The body of the reaction chamber is also surrounded by a waterjacket 23 through which hot water at 90°C. is circulated to prevent decomposition of carbonyl to form a sheet of nickel on the wall of the vessel. Surprisingly this leads to little loss of heat from the mass of pellets, since flow of the pellets is substantially laminar.

The remaining small amount of gases passes at a very low superficial velocity up through the neck of the vessel, where it comes into contact with the hottest pellets from the preheater. This decomposes the remaining small proportion of nickel carbonyl and the resulting substantially carbonyl-free carbon monoxide gas is withdrawn through the pipe 15 from the space under the cone 13 together with carbon monoxide that has passed down through the preheater. The gas that has followed this latter route constitutes the major part of that withdrawn from under the cone, and the flow of this gas downwards through the annular opening 14 sets up a back pressure which helps to prevent upward diffusion of gas from the reaction vessel. The gas withdrawn from the hollow cone is compressed by the compressor 16 and returned through the inlet 17 to the top of the tail pipe 4. The pressure of the gas and the dimensions of the tail pipe are such that the back pressure prevents the carbonyl-containing gases from the inlets 20 from passing through the tail pipe with the pellets. The gas introduced at 17 percolates up the elevator trunking and down again through the pellet reservoir and preheater back to the hollow cone 13.

The rate of flow of the pellets through the system is controlled by means of a gate valve (not shown) at the foot of the tail pipe.

The pellets leaving the tail pipe fall into a hopper 24 down which they pass through an aperture 25 on to an inclined plate 26 leading to the bottom of the elevator boot.

In order to prevent blockage of the elevator system by a mass of pellets accumulating in the bottom of the boot in the event of an elevator stoppage, the inclination of the plate 26 must be steep enough to allow small or irregularly shaped pellets to slide down it but not so steep that flooding of the boot occurs if the elevator stops. In practice an inclination of 28° to the horizontal is found to be satisfactory. The aperture 25 is so arranged that the pellets pile up on the plate 26 and block if the elevator stops. The hopper 24 will then normally fill with pellets until the exit from the tail pipe is blocked.

As the pellets pass repeatedly through the decomposer, they grow progressively in size by deposition of nickel on them, and pellets that have grown to a predetermined size are segregated by causing them to overflow preferentially to the smaller pellets from a conical pile 27 at the top of the reservoir and over a dam 28 and down a helical chute 29 and a discharge pipe 30 on to a screen 31. Undersize pellets that have overflowed the dam pass through the screen and are returned to circulation via the pipe 32, while the fully-grown pellets pass over the screen into a product hopper 33 from which they are periodically removed.

For stable continuous operation in production of nickel pellets, the rate at which nickel is removed from circulation as fully-grown pellets must, of course, be the same as that at which nickel is deposited on the pellets in the reaction chamber. Moreover, while uniform heating and radial mixing of the pellets in accordance with the invention make an important contribution to stable operation, it is also important to ensure that effective seed particles, i.e., particles large enough to act as growth nuclei instead of becoming incorporated in existing pellets or blown out of the reaction chamber with the exit gas, are introduced in the same numbers as product pellets are removed. Hence, if sufficient effective seed particles are not formed internally by breakage of existing pellets or otherwise, enough additional particles must be added, and if too many seed particles are found to be in circulation the excess must be removed, e.g., by an additional screening operation.

Although the present invention has been described in conjunction with certain advantageous embodiments, it is to be understood that other embodiments, which also may be advantageous, and modifications and variations may be resorted to without departing from the spirit and scope of the invention, as those skilled in the art will readily understand. Such other embodiments, modifications and variations are considered to be within the purview and scope of the invention and appended claims.

We claim:

1. In a carbonyl decomposer adapted for production of metal pellets and having a calandria of preheater tubes, a collecting chamber disposed to receive pellets from the preheater tubes, a decomposition reaction vessel connected to the collecting chamber with a passage between the collecting chamber and the reaction vessel and means for circulating pellets from the reaction vessel to the preheater tubes and thence successively through the preheater tubes, collecting chamber and reaction vessel, the improvements comprising a collecting chamber wall shaped as a frustum of an inverted cone and a baffle disposed in the passage between the collecting chamber and the reaction vessel so as to define in combination with the collecting chamber wall a restricted passage opening wide enough to allow pellets to pass therethrough, said baffle having a baffle wall which is shaped as a hollow cone and mounted apex upwards and has a gas release means communicating with an upper portion thereof, adapted to direct pellets radially outwardly through the opening and into the vessel, and said collecting chamber wall having at least one opening connected to emergency drain means through a normally closed valve whereby said collecting chamber and said preheater may be quickly drained of pellets by opening said valve.

2. Carbonyl decomposer apparatus as set forth in claim 1 wherein the apex angle of the conical baffle is about 90°.

3. Carbonyl decomposer apparatus as set forth in claim 1 wherein the interior wall of the conical-shaped collecting chamber is inclined inwardly about 23° from the vertical.

4. Apparatus in accordance with claim 1 wherein said valve is a magnetic valve.

5. Apparatus in accordance with claim 1 wherein the pellet collecting means is disposed below the preheater means and the decomposer means is disposed below the collecting means.

6. Apparatus in accordance with claim 1 wherein said means for circulating pellets comprises a tail pipe communicating said reaction vessel with hopper means associated with elevator means feeding said preheater.

* * * * *